United States Patent [19]

Byrd

[11] 4,216,927
[45] Aug. 12, 1980

[54] BAGGAGE HANDLING AND STORAGE SYSTEM

[75] Inventor: Chester L. Byrd, Beggs, Okla.

[73] Assignee: Air Cargo Equipment Corporation, Tulsa, Okla.

[21] Appl. No.: 883,388

[22] Filed: Mar. 6, 1978

[51] Int. Cl.² ............................................. B64D 9/00
[52] U.S. Cl. .................................. 244/118.1; 220/15; 220/8; 244/137 R
[58] Field of Search ...................... 244/118 R, 137 R; 220/1.5, 8, 4 R; 217/13; 105/355, 367

[56] References Cited

U.S. PATENT DOCUMENTS

| 3,741,504 | 6/1973 | Alberti et al. | 244/118 R |
| 3,966,075 | 6/1976 | Schultz | 220/8 X |
| 3,999,727 | 12/1976 | Rennemann | 244/118 R |

FOREIGN PATENT DOCUMENTS 1261050 2/1968 Fed. Rep. of Germany .............. 220/8

Primary Examiner—Barry L. Kelmachter
Attorney, Agent, or Firm—William S. Dorman

[57] ABSTRACT

An apparatus for handling and storing baggage or cargo within an aircraft fuselage including a fuselage door and a plurality of storage platforms with each platform consisting of a flat rectangular base and two upwardly extending side walls closely juxataposed to the shape of the fuselage. The platforms are capable of stacking one atop another when not in use adjacent the fuselage door. Each platform can move longitudinally relative to the aircraft fuselage away from and back towards the fuselage door in a telescoping sequence such that the uppermost platform will move away from said stack first and such that the lowermost platform will always return to said stack first.

6 Claims, 5 Drawing Figures

BAGGAGE HANDLING AND STORAGE SYSTEM

BACKGROUND OF THE INVENTION

1. Field of the Invention

This invention relates to a system for storing and handling cargo and baggage to be used in conjunction with airplanes having fuselages.

2. Description of the Prior Art

In many aircraft the lower portion of part of the fuselage is reserved for cargo and baggage space. Small individual items of cargo and baggage are frequently stowed there and are loaded through an opening or openings in the fuselage.

Frequently, a great amount of time and labor can be expended in this process. One method used to handle and store these small individual items is a simple, "bucket brigade" type of operation. Another method used to handle and store these items is to first containerize them outside the aircraft and then load the containers into the aircraft. Special ramp equipment may be necessary to load these containers. The container system itself occupies a significant amount of space. Also, unless the loading is carefully done, the limited amount of space may not be efficiently used.

Therefore, it is a principal object and purpose of this invention to provide a mounted, telescoping system to speed the loading and unloading of cargo and baggage. It is also a principal object and purpose of this invention to prevent undue reaching by baggage handlers by allowing a single baggage handler inside the aircraft to load the entire compartment without leaving the door area. It is a further object and purpose of this invention to more efficiently use the limited amount of cargo and baggage space available. No special ramp equipment is necessary for the loading and unloading of the present invention.

SUMMARY OF THE INVENTION

The present invention involves a system for storing and handling cargo and baggage to be used in conjunction with airplane fuselages. The storage chamber area includes a top platform, a middle platform, and a bottom platform. The top platform has a back wall continuously attached to its rear edge with a door incorporated into the back wall.

Parallel floor mounted roller tracks located on the interior of the airplane fuselage are adjacent to a door area in the fuselage and extend therefrom. Floor rollers which extend from the bottom of each of the platforms seat in the floor tracks. Parallel wall mounted roller tracks are provided on opposite sides of the interior of the airplane fuselage. Side rollers protruding form the sides of each storage platform seat in the wall tracks.

At the beginning of the loading operation, all of the platforms are stacked adjacent the fuselage door. The baggage loader places cargo or baggage on the top platform until it is fully loaded. The top platform is then moved on the roller tracks in a direction away from the fuselage door area. The movement of the platforms may be done manually or may be done by a power system.

The middle platform is loaded in a manner similar to the loading of the top platform. When the middle platform is fully loaded, it is moved along the roller tracks, with the top platform moving in a like amount.

When the bottom platform is fully loaded, it too is moved in a direction away from the fuselage door area revealing the interior of the fuselage. Cargo and baggage can then be placed against the sides and bottom of the aircraft to fill in the remaining area in front of the fuselage door area.

To unload the storage system, a reverse sequence is followed.

DETAILED DESCRIPTION OF THE PREFERRED EMBODIMENTS

As shown in FIGS. 1 through 5, a storage and handling system 10 is provided for cargo and baggage to be used in conjunction with airplanes having fuselages. The present invention speeds the loading and unloading of light weight parcels. The design of the storage area is substantially that of the interior of the fuselage thereby making the most efficient use of the limited amount of cargo and baggage space available.

Figure 2:
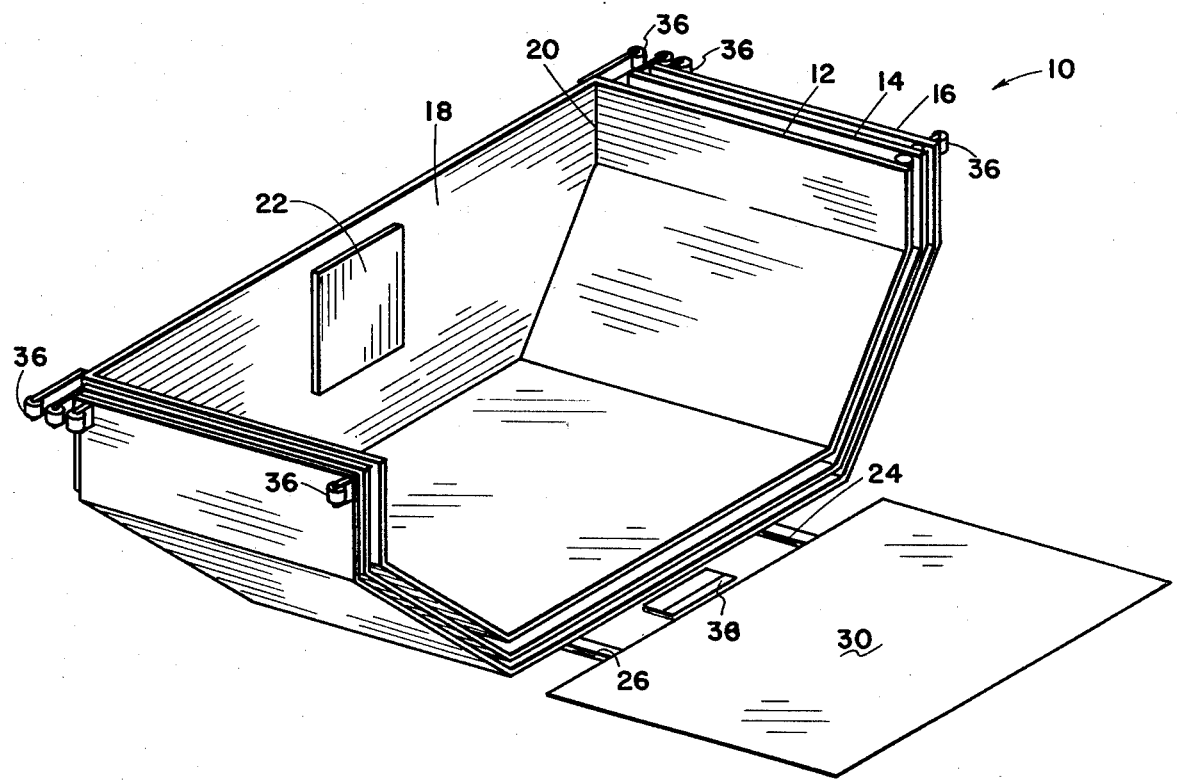
FIG. 2 is a perspective view of the handling and storage system shown in FIG. 1 as it would appear at the beginning of the loading sequence.

The storage chamber area includes three distinct platform components, a top 12, a middle 14 and a bottom 16. These platform components are generally "U" shaped and when not in use, will fit within each other as best seen in FIG. 2. The top platform 12 has a back wall 18 continuously attached to the rear edge 20. A small door 22 is furnished in the back wall 18 to provide possible access to the rear of the storage area. Although in the instant embodiment three telescoping platform components are utilized, a greater or lesser number could be used, as appropriate.

A number of parallel floor mounted roller tracks 24 and 26 are located on the bottom of the interior of the airplane fuselage 28. The relationship of the storage and handling system 10 to the fuselage 28 can be seen in FIG. 1. The roller tracks are adjacent to the fuselage door area 30. Floor rollers (not shown) which extend from the bottom of each of the platforms seat in the tracks 24 and 26.

A number of wall mounted roller tracks 32 and 34 are provided on opposite sides of the interior of the airplane fuselage. The wall mounted tracks 32 and 34 are parallel to each other and are also parallel to the floor mounted tracks 24 and 26. Side rollers 36 which protrude from the side of each storage platform seat in the roller tracks 32 and 34.

FIGS. 2 through 5 show the various positions or modes of the loading sequence. The baggage loader places cargo or baggage on the top platform 12. During this initial stage, all the platforms are stacked adjacent to the fuselage door area 30. When the top platform is fully loaded it is moved on the roller tracks in a direction away from the fuselage door area revealing the middle platform 14 underneath. The platforms may be positioned manually by the baggage loader by means of a hand crank or other similar device. They may also be automatically positioned through use of a motor or engine. Each component moves on the floor-mounted roller tracks and on the wall roller tracks.

Figure 1:
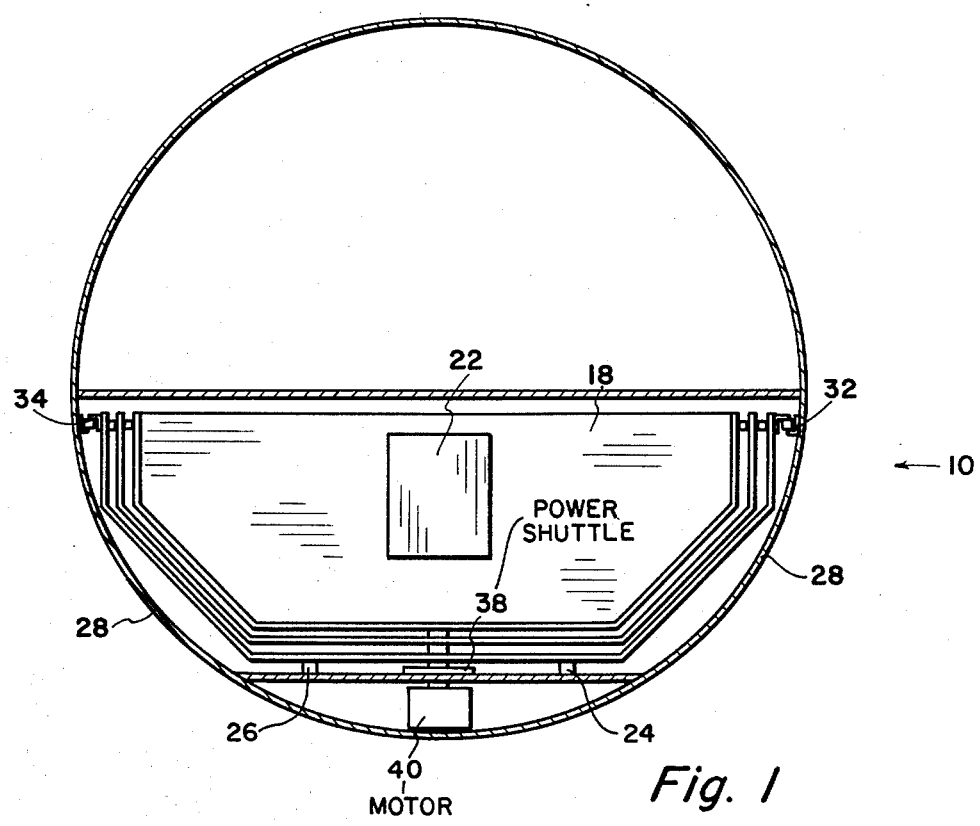
FIG. 1 is a front view of a handling and storage system for baggage and cargo as embodied in the present invention showing the aircraft fuselage cut-away for clarity.
Figure 3:
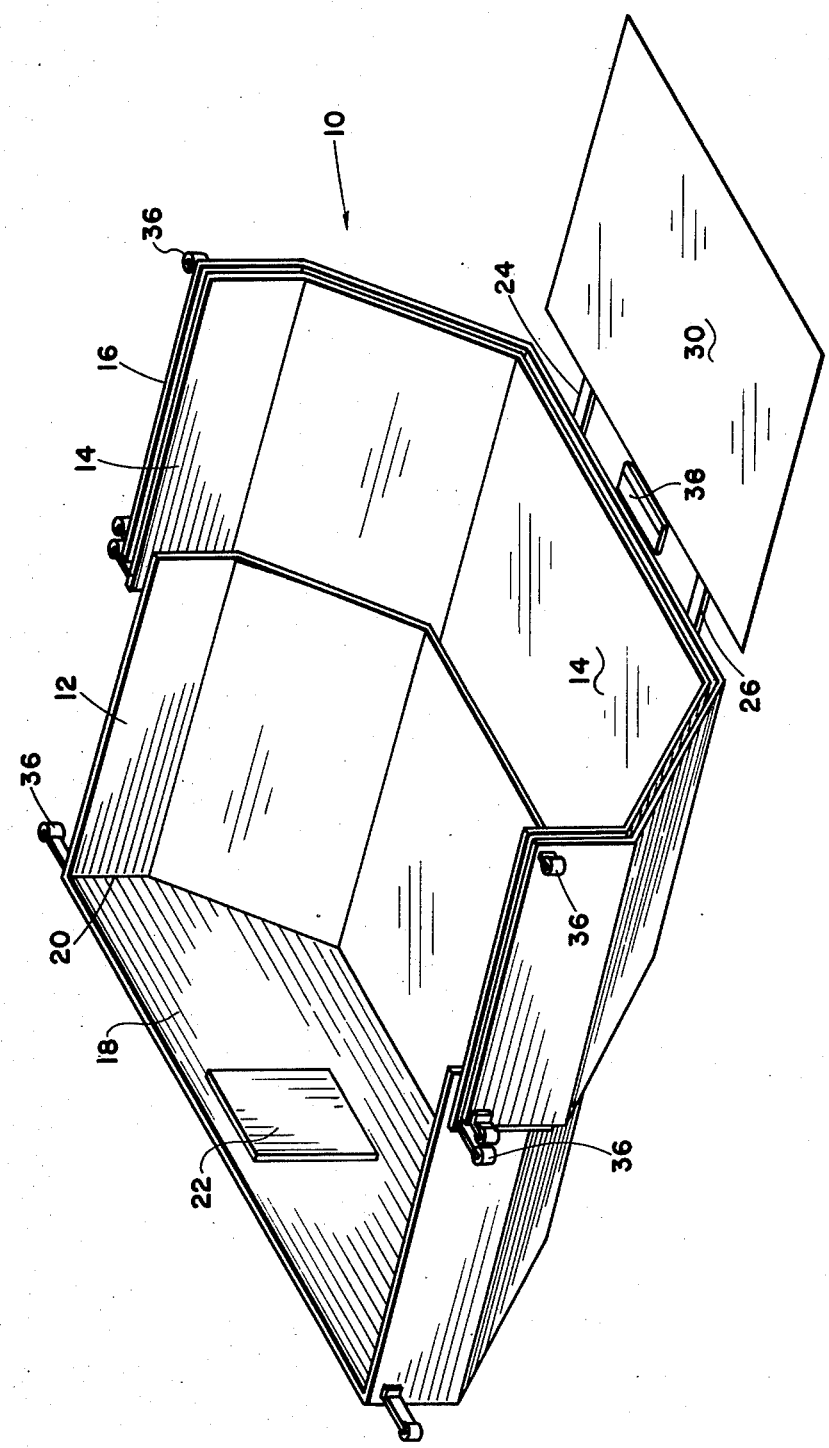
FIG. 3 is a perspective view of the handling and storage system shown in FIG. 1 in the loading sequence position following that of FIG. 2.
Figure 4:
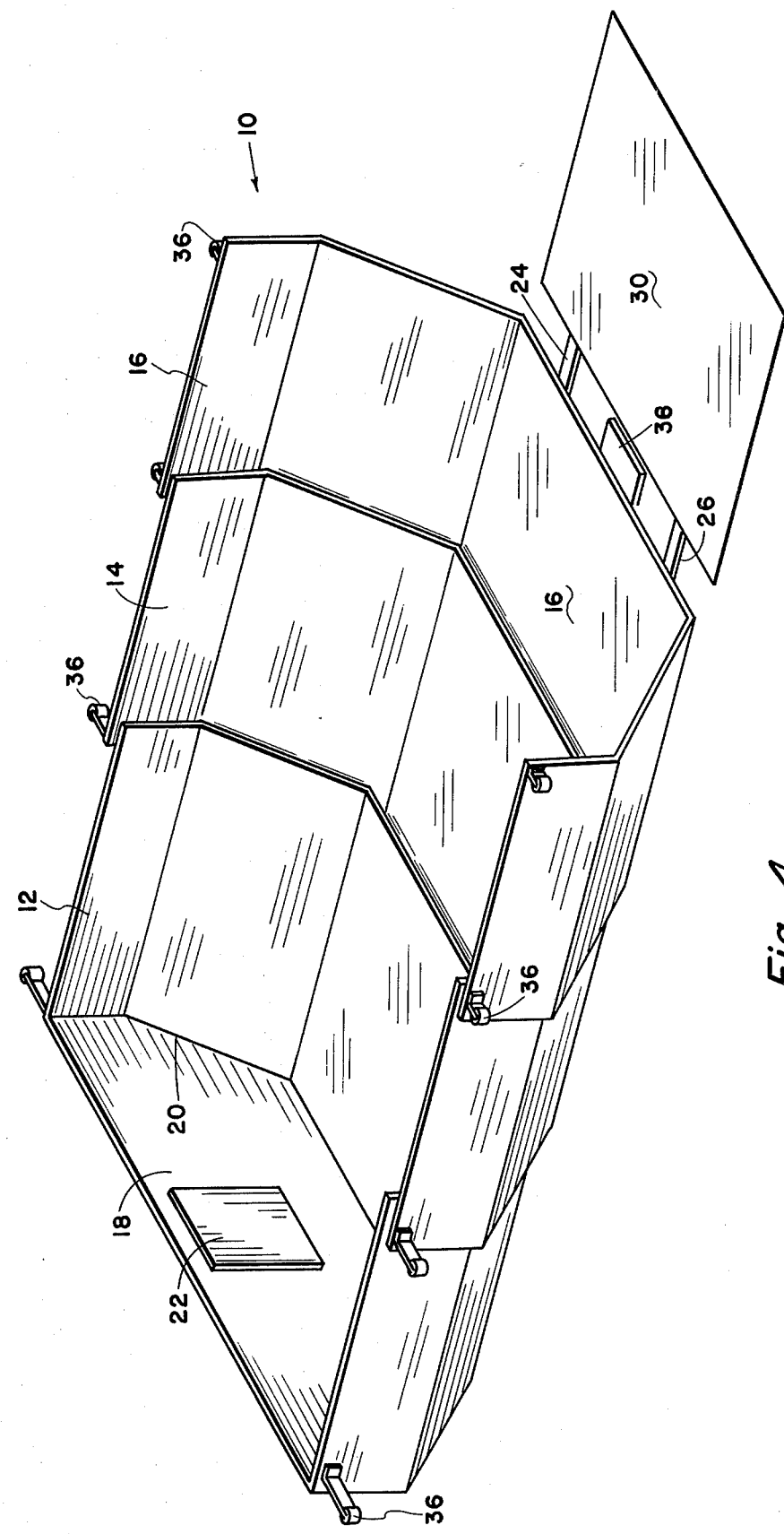
FIG. 4 is a perspective view of the handling and storage system shown in FIG. 1 in the loading sequence position following that of FIG. 3.
Figure 5:
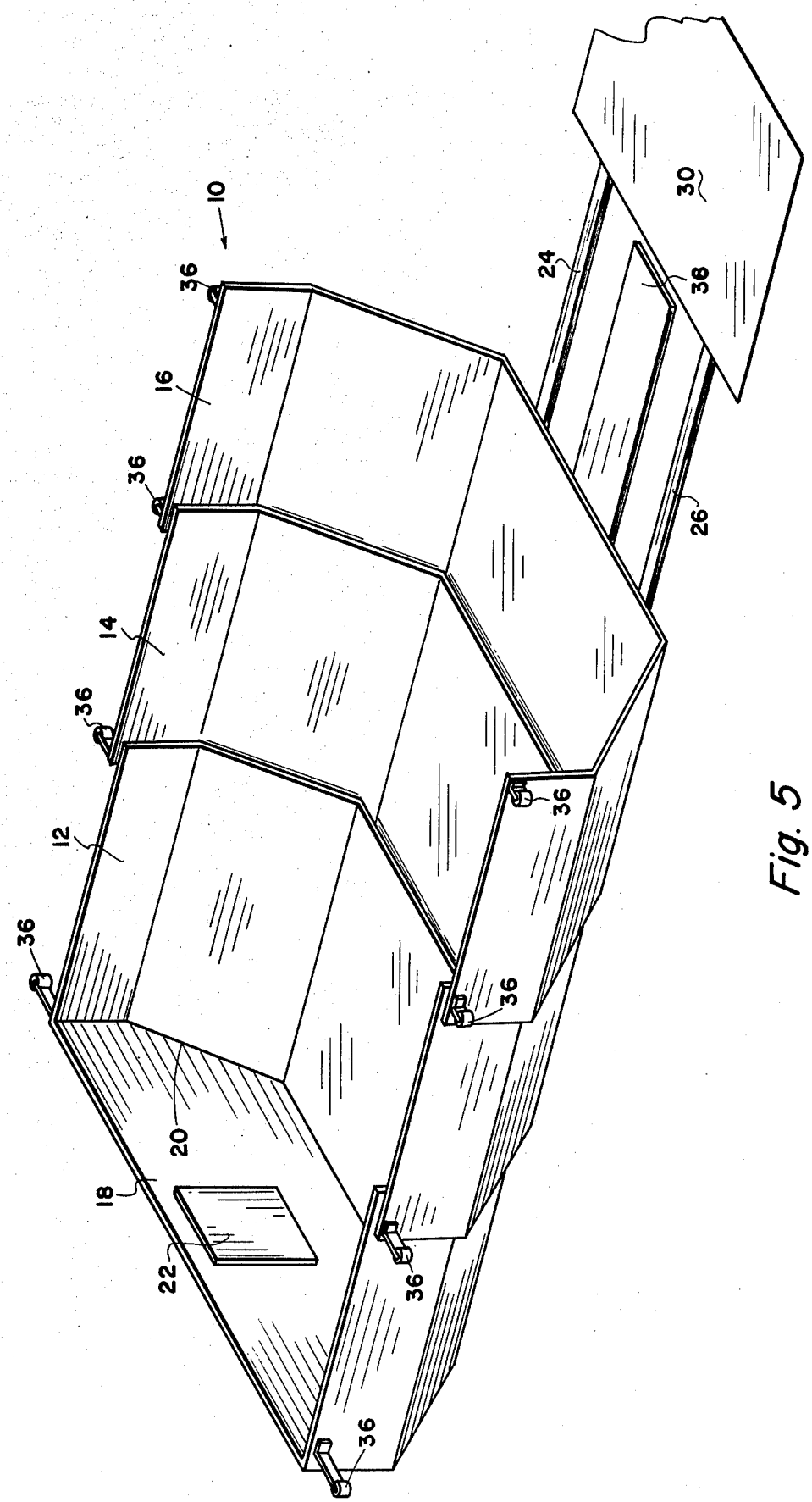
FIG. 5 is a perspective view of the handling and storage system shown in FIG. 1 in the loading sequence position following that of FIG. 4.

In the present embodiment, a power shuttle 38 moves the platforms along the roller tracks. The power shuttle is located between and parallel to the floor mounted roller tracks 24 and 26. The power shuttle is driven by a motor 40 as shown in FIG. 1.

Next, the middle platform 14 is loaded with baggage or cargo in a manner similar to the loading of the top platform. When the middle platform is fully loaded it, too, is moved in a direction away from the fuselage door revealing the bottom platform 16. When the middle platform is moved along the roller tracks, the top platform moves in a like amount This step can best be seen in FIG. 4.

When the bottom platform 16 is fully loaded, it too, is moved in a direction away from the fuselage door area 30. It should be noted that the telescoping platforms conform generally to the shape of the aircraft's fuselage 28. When the bottom component has been moved back the interior of the body of the aircraft is revealed. The baggage loader can then put in cargo and baggage against the sides and bottom of the aircraft to fill in the remaining area in front of the fuselage door area 30.

To unload the storage area, a reverse sequence is followed. The cargo and baggage against the sides and bottom of the aircraft are unloaded first. The bottom platform is then moved on the roller tracks until it is adjacent the fuselage door area 30. Next, the bottom platform is unloaded, and so on.

It can be readily perceived that a single baggage handler can load or unload the entire storage area without leaving his position in the door area of the airplane and with a minimum expenditure of energy.

Whereas, the present invention has been described in particular relation with the drawings attached hereto, it should be understood that other and further modifications, apart from those shown or suggested herein, may be made within the spirit and scope of this invention.

What is claimed is:

1. Apparatus for handling and storing baggage or cargo within an aircraft fuselage having door means in said fuselage to allow loading and unloading; comprising a plurality of storage platforms for operation with said fuselage, each platform consisting of a flat rectangular base and two side walls extending upwardly from the two edges of said base adjacent said fuselage, said side walls juxtaposed to the shape of said fuselage, said platforms, when unloaded, being stacked one atop another over a fixed position adjacent said fuselage door means and having at least an uppermost platform and a lowermost platform; roller means to allow longitudinal movement of each platform relative to said aircraft fuselage; and means for moving each platform away from and back towards said fixed position in a telescoping sequence such that the uppermost platform will move away from said stack first and such that the lowermost platform will always return to said stack first; whereby the uppermost platform is loaded first and when loaded is moved away from said fixed position to permit loading of the next lower platform; whereby said platforms are loaded serially commencing with the uppermost platform and ending with the lowermost platform; whereby, as each platform below said uppermost platform is loaded and moved away from said fixed position, all of the previously loaded platforms are moved further away from said fixed position until said lowermost platform is loaded; whereby, after said lowermost platform is loaded, all of said platforms in fully extended telescoped condition are moved away from said fixed position to permit loading over said fixed position and in the area of said fuselage door means.

2. Apparatus for handling and storing baggage or cargo as set forth in claim 1 wherein the uppermost platform in said stack includes a back wall attached to the rear edge of said uppermost platform.

3. Apparatus for handling and storing baggage or cargo as set forth in claim 2 wherein door means are provided on said back wall.

4. Apparatus for handling and storing baggage or cargo as set forth in claim 1 wherein said means for moving each platform comprises a power shuttle.

5. Apparatus for handling and storing baggage or cargo as set forth in claim 1 including a plurality of parallel floor mounted roller tracks located on the interior of said fuselage, said floor tracks adjoining said fuselage door means and extending therefrom; and wherein said roller means extend from the bottom of each platform and slide in said floor mounted roller tracks.

6. Apparatus for handling and storing baggage or cargo as set forth in claim 5 including a plurality of parallel wall mounted roller tracks located on opposite sides of the interior of said fuselage and parallel to said floor mounted roller tracks; and roller means extending from each platform side wall for sliding in said wall mounted roller tracks.

* * * * *